(12) United States Patent
Hager et al.

(10) Patent No.: US 6,713,913 B1
(45) Date of Patent: Mar. 30, 2004

(54) MOTOR HOUSING AND POLE-WELL, IN PARTICULAR FOR ELECTRIC WINDOW OR SUNROOF MOTORS

(75) Inventors: Martin Hager, Buehlertal (DE); Thomas Huck, Rheinmuenster (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/030,876

(22) PCT Filed: Nov. 17, 2000

(86) PCT No.: PCT/DE00/04040

§ 371 (c)(1),
(2), (4) Date: Apr. 29, 2002

(87) PCT Pub. No.: WO01/61133

PCT Pub. Date: Aug. 23, 2001

(30) Foreign Application Priority Data

Feb. 19, 2000 (DE) .......................................... 100 19 512

(51) Int. Cl.[7] ................................................. H02K 5/00
(52) U.S. Cl. ............................... 310/89; 310/98; 310/99
(58) Field of Search ................................. 310/89, 67 R, 310/98, 99

(56) References Cited

U.S. PATENT DOCUMENTS

| 5,268,607 A | * 12/1993 | McManus ..................... 310/89 |
| 5,343,774 A | * 9/1994 | Jang .......................... 74/421 A |
| 6,459,188 B1 | * 10/2002 | Lombardo et al. .......... 310/239 |

FOREIGN PATENT DOCUMENTS

| DE | 297 02 525 U | 6/1998 | |
| DE | 297 02 525 U1 | 7/1998 | |
| EP | 0 474 904 B1 | 7/1994 | |
| EP | 0474904 B1 | * 7/1994 | .......... H02K/23/66 |

* cited by examiner

Primary Examiner—Thanh Lam
(74) Attorney, Agent, or Firm—Michael J. Striker

(57) ABSTRACT

The invention pertains to a motor housing (1) as well as a pole cover (2), especially for window lift or sunroof motors, having at least one pole cover (2) and a housing (3) closing off the pole cover, which are fastened together using fasteners (4), whereby the pole cover (2) has multiple receptacles (5) for the fasteners (4), and the housing (3) closing off the pole cover has multiple counterreceptacles (6) for the fasteners (4) and for differing housings (3) which close off the pole cover differing receptacles (5) on the pole cover (2) cooperate with the counterreceptacles (6) by fasteners (4).

17 Claims, 4 Drawing Sheets

MOTOR HOUSING AND POLE-WELL, IN PARTICULAR FOR ELECTRIC WINDOW OR SUNROOF MOTORS

BACKGROUND OF THE INVENTION

The invention relates to a motor housing and a pole cover for an electric motor drive, especially for window lift or sunroof motors in a motor vehicle, according to the type of the independent claims.

Such housings for window lift motors or other actuating drives are generally known, DE-GM 29702525.2. The housings shown there disclose essentially two parts, a pole cover made of metal and a drive housing made of metal or plastic. In these motors there is usually a plastic brush holder located between the pole cover and drive housing which also serves as a seal. An integrated plug with a cable gland on the brush holder for supplying power to the motor extends from the motor. Both housing parts are connected together such that the plug extends undisturbed between two screw connections. The housing is constructed such that the brush holder with the plug connection can be rotated by 180° and the motor power supply can be brought in from the left or right side. There is no space however provided here in the housing for a printed circuit board.

In another version of the motor with integrated electronics EP 0 474 904 B1 and integrated electronics housing, the brush holder is located on a printed circuit board which is parallel to the motor shaft. The printed circuit board is brought out parallel to the motor shaft and laterally alongside to an electronic plug. This can however result in a collision of the printed circuit board with one of the screw connection between the pole cover and the drive housing. This problem is avoided here by giving the printed circuit board a very narrow, neck-like configuration in the area of the housing screw connection and bringing it out past the screw connection of the pole cover and drive housing. This form of printed circuit board is however quite expensive to produce and represents a severe limitation to placing on the printed circuit board larger area components. A further drawback to this solution is that different pole covers have to be manufactured for different housing types, which creates difficulties in manufacturing and is overall quite cost-intensive. By selecting a pole cover with three receptacles it would no longer be possible to exchange the plug with a motor with no electronics. This is considered however a distinct drawback. Furthermore it is necessary for different motor versions, when for example later space considerations dictate that the printed circuit board be brought out on the other side of the motor, to design completely new individual housing parts whereby the screw points between the pole cover and the drive housing are placed so that the printed circuit board can be brought out on this side.

SUMMARY OF THE INVENTION

The arrangement according to the invention having the features of the main claim has the advantage that a universal pole cover is created that can be fitted to various drive- and electronics housings for various motor housings. The resulting modular production process offers enormous advantages. The most expensive housing part, the pole cover, can be produce in very large quantities, and the associated less expensive housing parts for the drive, electronics and plug can be varied cost favorably depending on the requirements of the motor housing, without restricting the functionality of the various motor housing types. Furthermore the customary high connection strength is achieved even in the various constellations, since - as usual - four connection points can be used.

The features described in the dependent claims make possible advantageous further embodiments of the arrangement according to the main claim. If the pole cover has at least one more receptacle than the housing closing off the pole cover, and if one receptacle and/or counterreceptacle is not used, the result is a great degree of flexibility for combining the pole covers with various housing parts. By not using receptacles and/or counterreceptacles, the space one has save can be used for various specifications of the various housings.

The arrangement of the receptacles in the corners of a rectangle has the advantage of compatibility with currently available drive housings. These pole covers can also be used for actuating motors without electronics. If a fifth receptacle is provided on a short side of the rectangle, the overall width of the motor housing is not increased, which is important for installing it in motor vehicle roofs and doors. In addition, this fifth receptacle can then better absorb the forces of two adjacent, optionally unused receptacles.

In the case of a pole cover with five receptacles for a motor without electronics, the plug neck can be arranged as desired on the left or right. This is made possible by placing the four receptacles in the corners of the rectangle, which are arranged point-symmetric to the motor shaft. This represents a significant gain in flexibility for installing and wiring up the motors. By using a sixth receptacle the connection strength of the motor housing is further increased without making the motor housing wider. In this solution the form and length of the plug neck is adapted to the location of the sixth receptacle.

If the housing closing off the pole cover is a drive housing, and if a brush holder with a connecting plug is attached in between, the motor housing can be used fully interchangeably with traditional motors. The positioning of the fifth receptacle opposite the plug is advantageous, since the result is that no construction changes are necessary for the plug neck.

Furthermore the same pole cover can also be used for motors having integrated electronics without preventing any optimal arrangement of the printed circuit board. By not using one of the receptacles in the corner of the rectangle, the printed circuit board in the motor with electronics can extend parallel to the flattened drive housing wall parallel to the long side of the rectangle, without being hindered by one of the connection elements that are otherwise located in all four corners of the rectangular pole cover flange. An advantage of this method of installing the printed circuit board is the possibility of fitting larger electronic components such as relays on the printed circuit board without being restricted by the housing wall. Moreover, the mounting of the printed circuit board is simplified by its parallel orientation to the housing wall.

By screwing additional optional, asymmetrically arranged receptacles, the strength as compared with screwing having three fastening points is increased. This has the advantage that the constructional width of the motor corresponding to the short side of the named rectangle is not increased. The location of the fifth receptacle next to the unused fastening receptacle ensures that the joining strength is not diminished by the unused fastening receptacle.

The compatibility of the pole cover with the housing closing off the pole cover for motors having only one plug, for motors with provision for a plug-in electronic module and motors having integrated electronics make the production independent of any rapid market changes in the direction of integrated electronics. The still current need for purely mechanical motors is accounted for in this product by the fact that the plug for the power supply can be optionally located on the left or right.

Such a solution for the motor housing having only one type of pole cover with five or six receptacles for all motor types is of course very cost-effective and favorable to manufacturing.

BRIEF DESCRIPTION OF THE DRAWINGS

The drawing shows embodiments of a device according to the invention and is explained in greater detail in the following description.

DETAILED DESCRIPTION OF THE PREFERRED EMBODIMENTS

Figure 1:
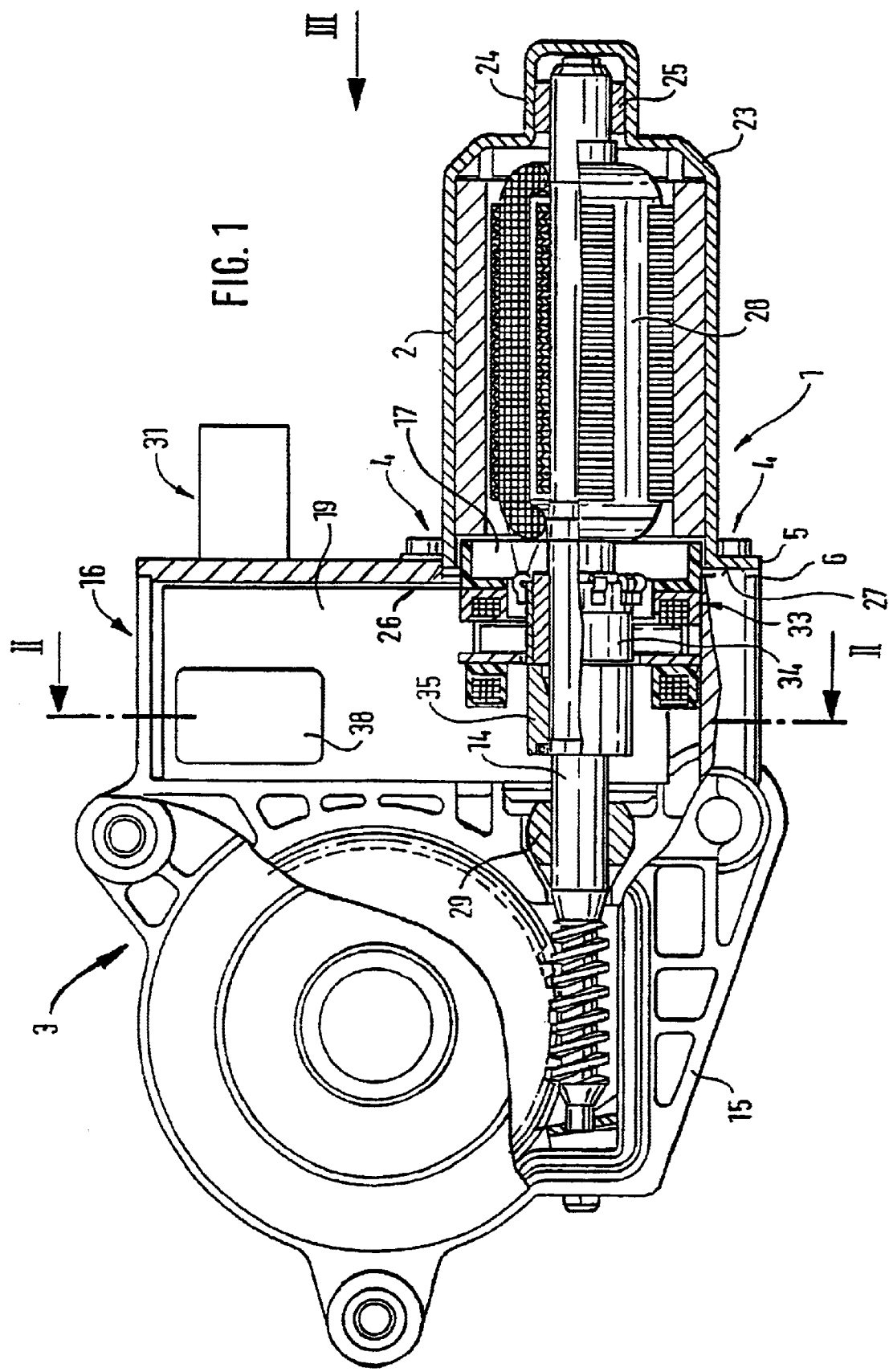
FIG. 1 shows an embodiment of a motor housing in cross-section.

The embodiment represented in FIG. 1 shows a motor housing 1 according to the invention having integrated electronics, especially for actuators in a motor vehicle, whereby the embodiment relates in particular to an window lift motor. The motor housing 1 incorporates a pole cover 2 and a housing 3 closing off the pole cover 2, with the housing 3 shown here as a drive housing 15 with an integrated electronics housing 16. The pole cover 2 consists of a deep-drawn, flattened cylindrical tube at the end of which a holder 24 for a pole cover bearing 25 is formed. At the other end of the pole cover 2 a flange 26 is formed in which receptacles 5 are provided for fasteners 4, here in the form of bolts. These receptacles 5 cooperate with counter-receptacles 6, here in the form of blind threaded holes, arranged on a flange of the drive housing 27, using the fastening elements 4, whose arrangement is shown in greater detail in FIG. 3.

The pole cover includes an armature 28, which is penetrated by a motor shaft 14 which is held in the pole cover bearing 25 and in a spherical bearing 29.

A printed circuit board 19 having electronic components and an integrated electronics plug 31 is arranged parallel to the motor shaft 14 and passes below the latter. In this arrangement of a rectangular printed circuit board 19 its width extends over the area of a collector 34 and of a ring magnet 35 attached to the motor shaft 14. For this purpose the pole cover 2 is short enough so that it does not surround the collector 35. Two brushes 33 with terminals for the power supply are held by a separate component 17 which is clamped between the pole cover 2 and the housing 3 closing off the pole cover. This component 17 also serves as a planar form seal between the two flanges 26 and 27 of the pole cover 2 and the housing 3 closing off the pole cover 2. It extends with the brushes 33 over the flanges 26 and 27 as far as the collector 34. The wide rectangular printed circuit board 19 in the area of the ring magnet 35 can accommodate larger area sensors 37 or other electronic components in the direct vicinity of the ring magnet 35.

Figure 2A:
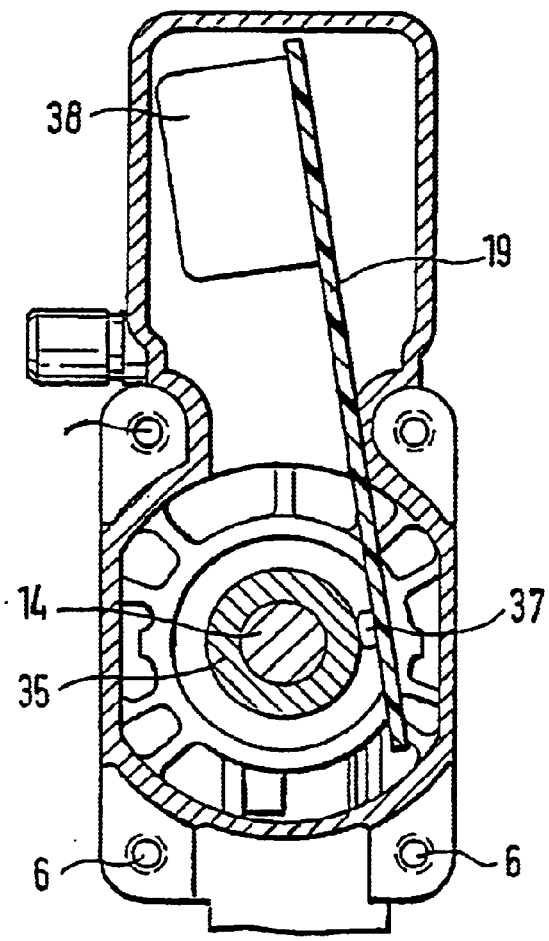
FIGS. 2a and 2b each show a view of already known embodiments corresponding to a section along line II-II in FIG. 1, FIGS. 3a through 3c each show a schematic representation of various embodiments in the direction of arrow III in FIG. 1.

FIG. 2a shows in cross-section how a printed circuit board 19 can be accommodated in a traditional motor housing having the usual four receptacles 5. The printed circuit board 19 carries a sensing device 37 and must therefore be located in the area of the rotor shaft 14 in its direct vicinity. The printed circuit board 19 extends from the rotor shaft 14 into the electronics housing 16 and for this purpose must be located on it, which limits the space for larger components located here such as relay 38 and makes installation of the printed circuit board 19 difficult.

Figure 2B:
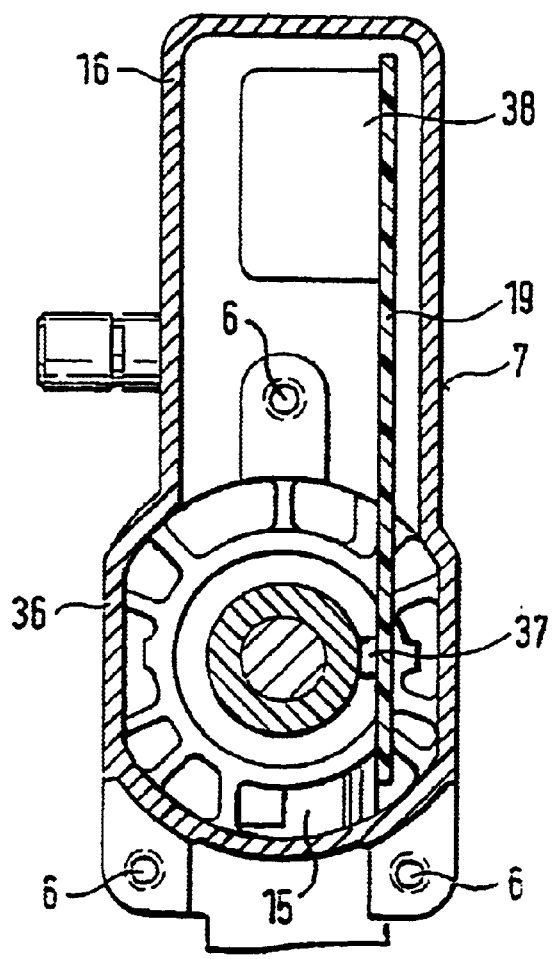

To eliminate this disadvantage, another known solution according to FIG. 2b reduces the number of receptacles 5, whereby the printed circuit board 19 can be arranged parallel along a long side 7 of the electronics housing 16 without crossing over a receptacle 5. By reducing the number of receptacles however the strength and security of the joint between pole cover 2 and drive housing 15 can fall below a tolerable value.

Figure 3A:
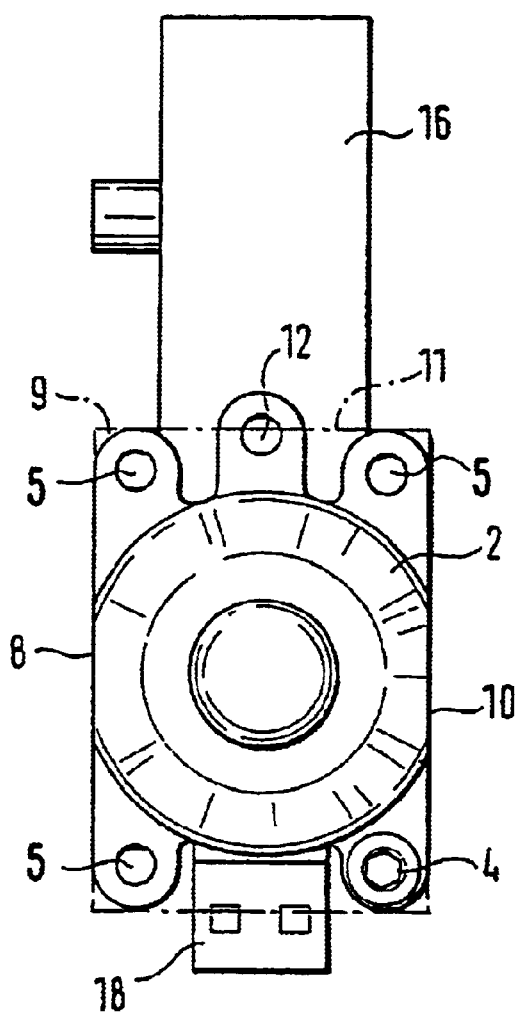
Figure 3B:
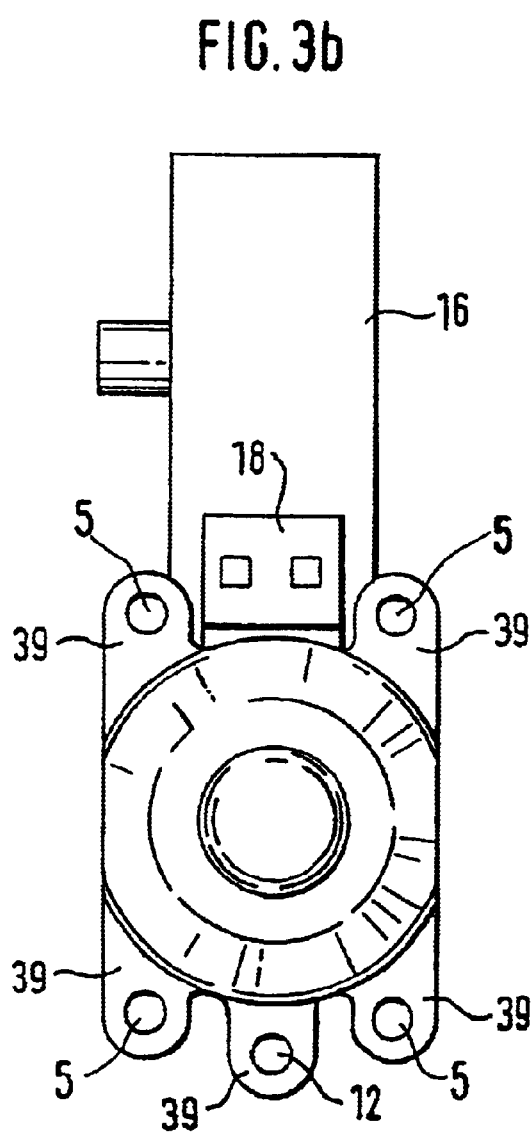
Figure 3C:
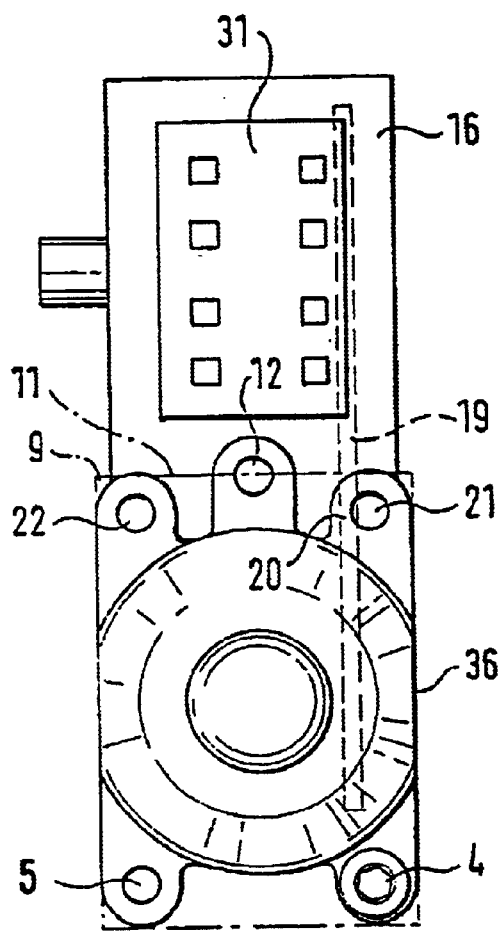

FIGS. 3a-3c schematically show the various combination possibilities of a pole cover 2 with five receptacles 5. Four of the five receptacles 5 are arranged in the corners 9 of a rectangle 8. The rectangle 8 has long sides 10 and short sides 11. The pole cover 2 and the drive housing 15 have flattened housing walls 36, which extend parallel to the long sides 10 of the rectangle. A fifth receptacle 12 is arranged at one of the short sides 11 of the rectangle 8. The receptacles 5 of the pole cover 2 are formed here as depressions in the pole cover flange 26, so that starting from a circular flange surface outwardly curved sheet metal tongs 39 are formed (FIG. 3b). The exact shape and size of these sheet metal tongs 39 can be designed in various ways.

FIG. 3a shows the arrangement of the pole cover 2 on a drive housing 15 without electronics.

The four receptacles 5 in the corners 9 of the rectangle 8 are fitted with fasteners 4, and the fifth fastening receptacle 12 contains no fastener. A two-pole plug 18 for the motor power supply, which is formed as a projection of component 17, extends out over the left side of the construction opposite the fifth receptacle 12 between two fasteners 4. The plug 18 includes here bushings for the corresponding plug lugs of the connection cable. The plug lugs can however also be mounted on component 17.

FIG. 3b shows a second possible position of the plug 18 using the same pole cover and drive housing 2 and 15. The component 17 with plug 18 and the pole cover 2 are turned 180° as compared with FIG. 3a, so that the plug 18 extends to the right. This is possible because the four receptacles 5 are arranged in the corners 9 of the rectangle 8 point-symmetric to the motor shaft 14.

FIG. 3c shows the same pole cover together with a drive housing 15 with integrated electronics housing 16. On the right side of the electronics housing 16 is a multi-pole electronics plug 31 which is connected to the printed circuit board 19. Only three fastening receptacles 5 are used. The printed circuit board 19 extends parallel along the flattened housing wall 36 and crosses over an area 20 of an unused receptacle 21. This area 20 is defined such that in case a fastener 4 is used its contact with the printed circuit board 19 or with any components located on it cannot be reliably excluded. The fifth receptacle 12, in this case occupied by a fastener, is next to the unused receptacle 21, i.e. outside the area 20. The precise location of the fifth receptacle 12, whether exactly on the short rectangle side 11 or exactly in the middle of it, is not critical. Here an additional receptacle 22 in the corner 9 of the rectangle 8 opposite the printed circuit board 19 can be used to increase the fastening strength of the motor housing 1.

Figure 4:
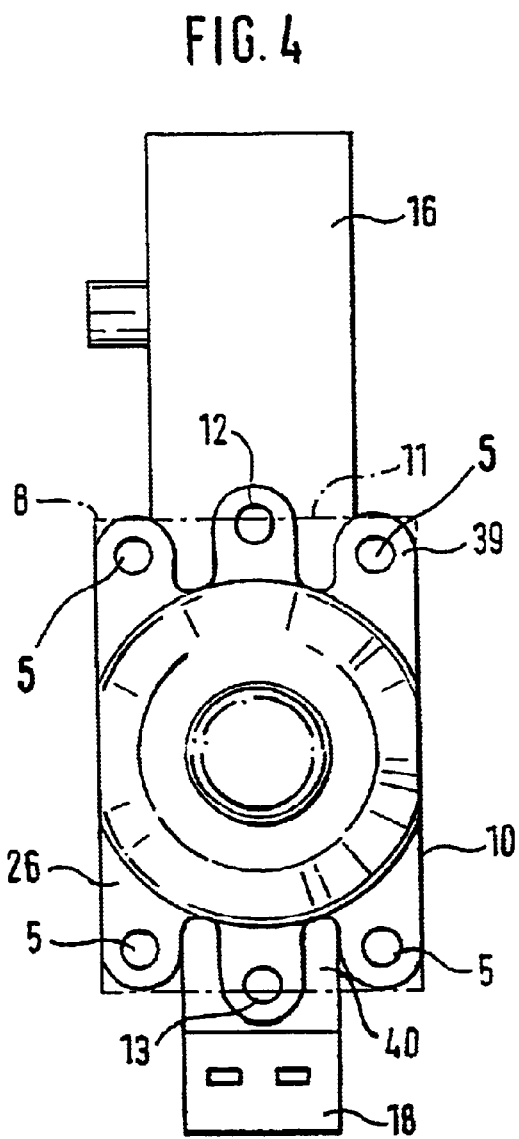
FIG. 4 shows an additional embodiment according to FIG. 3.

FIG. 4 shows an additional embodiment in the schematic representation according to FIG. 3. The flange 26 of the pole cover 2 has here a sixth receptacle 13 opposite the fifth receptacle 12. This has the advantage of additional fastening strength of the motor housing.

Between flange 26 and plug 18 there is a plug neck 40 as a part of the component 17, which is correspondingly extended in length. This embodiment as well, conceivably with additional receptacles 5, can be universally used for various housings 3 closing off the pole cover.

We claim:

1. Motor housing (1), especially for window lift motors or sunroof motors, having at least one pole cover (2) and a housing (3) closing off the pole cover, which are joined using fasteners (4), characterized in that the pole cover (2) has several receptacles (5) for the fasteners (4), that the housing (3) closing off the pole cover has several counter-receptacies (6) for the fasteners (4), wherein the pole cover can be combined with different types of housings (3), wherein for combining the pole cover with the different types of housings (3), at least partially various receptacles (5, 12) on the pole cover (2) cooperate with corresponding counterreceptacles on the housing (3) by means of fasteners (4).

2. Motor housing (1) according to claim 1, characterized in that the pole cover (2) has at least one receptacle (5) more than the housing (3) closing off the pole cover has counter-receptacles (6).

3. Motor housing (1) according to either claim 1 or 2, characterized in that when the pole cover (2) is attached to the housing (3) closing off the pole cover, at least one receptacle (5) and/or counterreceptacle (6) is free of a fastener.

4. Motor housing (1) according to one of claims 1–3, characterized in that the pole cover (2) has five receptacles (5) of which four receptacles (5) form the corners (9) of a rectangle (8).

5. Motor housing (1) according to claim 4, characterized in that the rectangle (8) has long (10) and short (112) sides and that the fifth receptacle (12) is located in the area of a short rectangle side (11).

6. Motor housing (1) according to claim 4 or 5, characterized in that on the pole cover a sixth receptacle (13) is located opposite the fifth (12).

7. Motor housing (1) according to one of claims 4–6, characterized in that the four receptacles forming the corners (9) of the rectangle (8) are arranged pointsymmetric to a motor shaft (14) arranged in the motor housing (1).

8. Motor housing (1) according to one of claims 1 through 7, characterized that the housing closing off the pole cover (2) is a drive housing (15).

9. Motor housing (1) according to any of claims 1 through 8, such that the housing (3) closing off the terminal housing accommodates electronics (16).

10. Motor housing (1) according to any of the preceding claims, characterized in that component (17) incorporating a plug (18) is located between the pole cover (2) and the housing (3) closing off the pole cover.

11. Motor housing (1) according to claims 4 and 10, characterized in that the fifth receptacle (12) is located opposite the plug (18).

12. Motor housing (1) according to claims 1 through 11, characterized in that a printed circuit board (19) is located in the housing (3) closing off the pole cover and the printed circuit board (19) extends parallel along the long side (10) of the rectangle (8) and in so doing crosses over the area (20) of an unused receptacle (21).

13. Motor housing (1) according to claim 12, characterized in that the fifth receptacle (12) located on a short side (11) of the rectangle (8) lies next to the unused receptacle (21) and is connected to a counterreceptacle (6) using a fastener (4).

14. Motor housing (1) according to claims 1 through 13, characterized in that the fasteners (4) are screws, rivets or press pins.

15. Pole cover (23) with a flange (26) on at least one open end and formed receptacles (5) on this flange (26), especially for use for motor housings according to one of the preceding claims, characterized in that there are at least five receptacles (5) of which four receptacles (5) form the corners (9) of a rectangle (8).

16. Pole cover (23) according to claim 15, characterized in that the corner (8) has long and short sides (10,11) and that the fifth receptacle (12) is located in the area of a short rectangle side (11).

17. Pole cover (23 according to claim 15 or 16, such that a sixth receptacle (13) is located on the pole cover (2) opposite the fifth receptacle (12).

* * * * *